D. E. REID.
APPARATUS FOR THE TREATMENT OF PLASTIC MATERIAL.
APPLICATION FILED FEB. 21, 1914.
1,187,929.  Patented June 20, 1916.
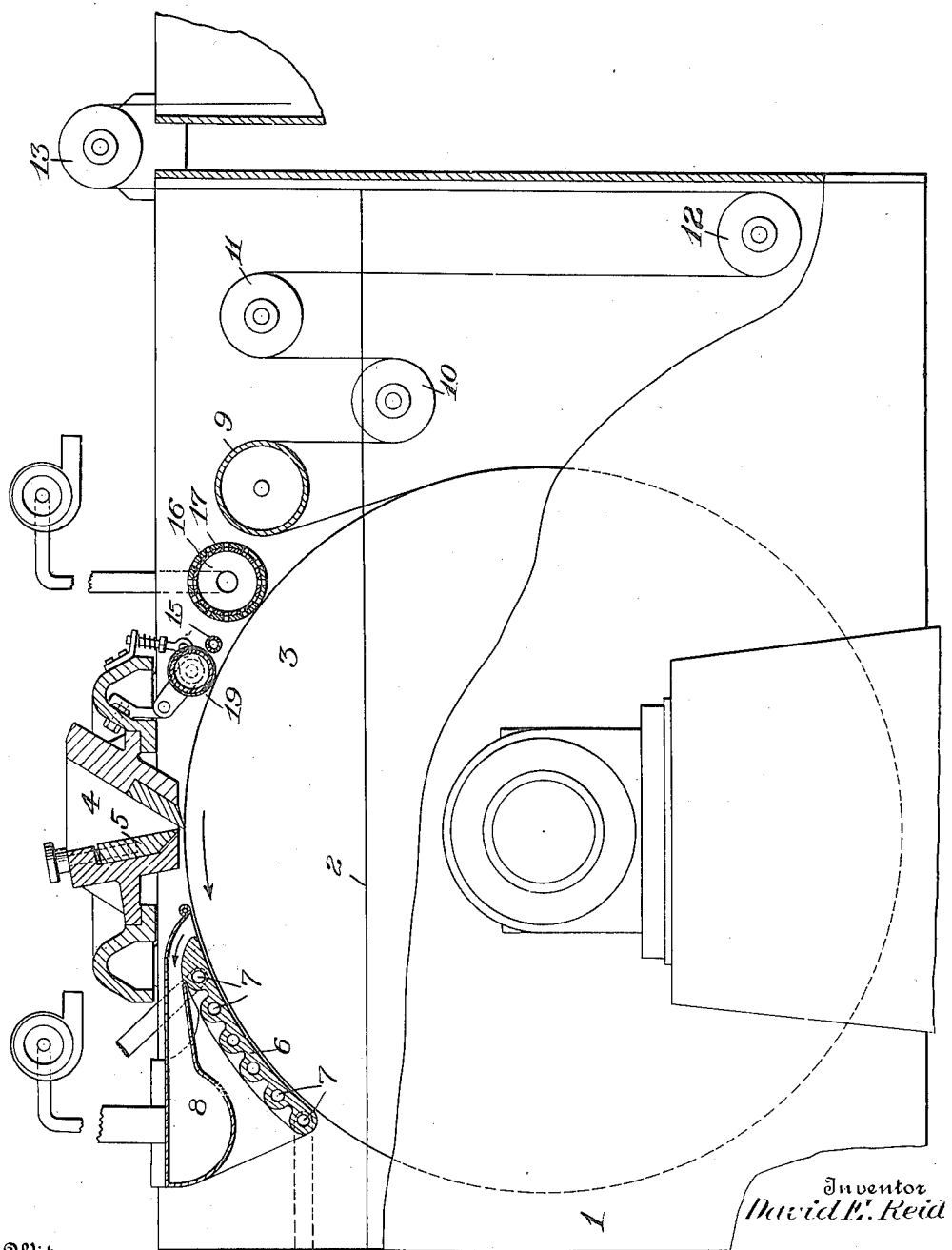

UNITED STATES PATENT OFFICE.

DAVID E. REID, OF ROCHESTER, NEW YORK, ASSIGNOR TO EASTMAN KODAK COMPANY, OF ROCHESTER, NEW YORK, A CORPORATION OF NEW YORK.

APPARATUS FOR THE TREATMENT OF PLASTIC MATERIAL.

1,187,929.  Specification of Letters Patent.  Patented June 20, 1916.

Application filed February 21, 1914. Serial No. 820,147.

*To all whom it may concern:*

Be it known that I, DAVID E. REID, of Rochester, in the county of Monroe and State of New York, have invented certain new and useful Improvements in Apparatus for the Treatment of Plastic Material; and I do hereby declare the following to be a full, clear, and exact description of the same, reference being had to the accompanying drawing, forming a part of this specification, and to the reference-numerals marked thereon.

My present invention has for its object to provide an apparatus for the treatment of liquid or plastic material and more particularly for the formation into sheets, webs, pellicles or filaments of such material which is treated by being subjected to the action of a liquid, as, for instance, the formation of a sheet from an aqueous solution of viscose or cellulose xanthate which is coagulated or rendered insoluble by treatment with different chemical solutions, although some of the features of my invention are useful for other purposes.

To these and other ends the invention consists in certain improvements hereinafter described, the novel features of which are pointed out in the claims.

In the drawings forming a part of this application, I have shown an enlarged view partly in section of an apparatus constructed in accordance with my invention and particularly adapted for the formation of sheets or webs of such material as viscose.

In said drawings, 1 indicates a tank constructed of any suitable material and adapted to contain a liquid which is maintained at about the level indicated by the line 2. 3 indicates a drum or wheel mounted in suitable bearings in the sides of the tank adapted to revolve in the direction indicated by the arrow. The surface of this drum is smooth and polished and its axial length is substantially that of the width of the web to be formed. Arranged over the upper surface of the drum and above the fluid is a receptacle or hopper indicated by 4 into which the plastic material is delivered in any suitable manner and said hopper is provided with an adjustable gate 5 so that the proper quantity of material can be allowed to flow on the surface of the drum as it revolves, and the material so deposited will be carried by the rotation of the drum beneath the surface of the treating liquid. In the manufacture of viscose sheets, the fluid contained in the tank in which the drum revolves operates to coagulate the viscose and it is found that instead of allowing the liquid viscose deposited upon the drum to enter the coagulating liquid in the condition that it comes from the hopper, it is advisable to preliminarily coagulate or set its surface in order to prevent waves of undulations which would be caused by introducing the liquid viscose directly therein and for this purpose, I arrange a heating plate or dry coagulating device in proximity to the surface of the drum and between the hopper and the surface of the liquid. In the present embodiment, this consists of a casting indicated by 6, having a series of channels 7 therein into which steam or other suitable heating medium may be introduced and circulated from any suitable source. The under side of this heater conforms somewhat to the surface of the drum and extends from near the hopper toward the surface of the liquid in the tank.

8 indicates a hood preferably constructed of sheet metal and extending in close proximity to the surface of the drum above the upper edge of the heater, the interior of the hood being connected to a suitable air exhausting device so as to draw the heated air upwardly between the heater and the drum surface whereby the plastic material on the drum will be heated not only by direct radiation from the heater but by the upwardly rising current of hot air and a portion of the moisture removed. The particular form of heater and the air circulating device are not essential, although the arrangement shown is admirably adapted for the purpose. The preliminary heating or coagulation of the plastic material before it enters the bath is found in practice to be advantageous. The plastic material is carried on the surface of the drum down into and through the liquid coagulant and the web is detached from the surface, passes over the roll 9 under the roll 10, over the roll 11, under the roll 12, then up and over the roll 13 and through other tanks or suitable apparatus for further treatment.

In order that the surface of the drum may be cleansed and prepared for the reception of the plastic material, I arrange between the surface of the liquid in the tank and the hopper, a washing device for effectively removing from the drum surface the fluid coagulant which might remain on the drum beneath the deposited plastic material and by crystallization or otherwise, injuriously affect the surface of the web. This cleansing means, in the present embodiment, consists of a water spraying device formed of a pipe 15 having fine perforations in the under side thereof. This pipe extends longitudinally of the drum and serves to apply fine streams or a spray of water or other cleansing fluid to its surface. The cleansing fluid is not allowed to enter the tank but is arrested and conveyed away by a dam, coöperating with the surface of the drum at a lower level and on the rising side of the drum as it rotates. The dam which I have found best adapted for this purpose consists of a hollow roll 16 having its periphery covered with a layer of soft rubber 17 through which a series of fine apertures are provided, communicating with the interior of the roll and the said interior is connected to a suitable pump or air exhausting device which draws the air and the washing water arrested by the dam, through the orifices into the roll and conveys it to any suitable point of deposit outside of the tank. The exhausting device is of sufficient capacity to remove the water from the drum surface and with it, any of the liquid drawn up from the tank. The surplus moisture on the surface of the drum is removed and the drum surface partially dried by an absorbent roll 19 having its surface covered with fabric and its interior may, if desired, be heated to facilitate the drying. It is not necessary that the drum surface be absolutely dry before it reaches the hopper but the washing operation thus accomplished is found to be sufficient for all practical purposes.

It will be understood that so far as my present invention is concerned, the character of the liquid in the tank and its action upon the plastic material is immaterial as the apparatus is capable of being used for various purposes which involve either the preliminary drying or treatment of the deposited material or the provision of a clean surface to receive deposited material, or both, but it is, as a whole, particularly useful in the manufacture of sheets of a material which requires a preliminary drying or setting operation and subsequent treatment by a liquid.

I claim as my invention:

1. In an apparatus for the manufacture of plastic material in lengths, the combination with a tank containing a liquid, of a rotary drum having a portion of its surface submerged in the liquid, means for depositing material on the drum and a heater arranged in proximity to the drum and between the depositing device and the surface of the liquid.

2. In an apparatus for the manufacture of plastic material in lengths, the combination with a tank containing a liquid, of a rotary drum having a portion of its surface submerged in the liquid, means for depositing material on the drum surface, means for heating the outer surface of the material deposited on the drum and located in close proximity to the drum and between the depositing means and the surface of the liquid.

3. In an apparatus for the manufacture of plastic material in lengths, the combination with a tank containing a liquid, a rotary drum partially submerged therein and means for depositing material on the drum surface, of a heater arranged in close proximity to the drum and between the depositing means and the surface of the liquid, means for supplying liquid to the drum surface in rear of the depositing means and means located between the liquid supply and the liquid in the tank for removing the liquid from the drum surface.

4. The combination with a tank containing liquid, and a rotary drum partially submerged therein, of an elastic rotary dam coöperating with the surface of the drum and a liquid supply located above it.

5. The combination with a tank containing liquid and a rotary imperforate drum partially submerged therein, of a hollow roller having a yielding perforated surface in contact with the outer surface of the drum and arranged at a level below the crest or upper side thereof and a suction apparatus connected to the interior of the roll.

6. The combination with a tank containing liquid, a rotary drum partially submerged therein, and means for supplying a fluid to the surface of the drum, of means for supplying liquid to the drum surface in rear of the first mentioned means, a hollow perforated roll having a yielding surface coöperating with that of the drum and a suction apparatus connected with the interior of said roll.

7. The combination with a tank containing liquid, a rotary drum partially submerged therein and means for supplying plastic material to the surface of the drum, of means for supplying liquid to the drum surface in rear of the first mentioned means, a dam coöperating with the surface of the drum below said liquid supplying means, and an element composed of absorbent material arranged in intimate contact with the surface of the drum between said liquid supplying means and the receptacle for plastic material.

DAVID E. REID.

Witnesses:
C. E. MARTIN,
ARMAND A. MAURER.